United States Patent [19] [11] 3,961,016
Gerstein et al. [45] June 1, 1976

[54] METHOD OF REMOVING CARBON MONOXIDE FROM GASES

[75] Inventors: Bernard C. Gerstein, Ames, Iowa; David B. Macaulay, Arlington Heights, Ill.

[73] Assignee: The United States of America as represented by the United States Energy Research and Development Administration, Washington, D.C.

[22] Filed: Apr. 26, 1974

[21] Appl. No.: 464,428

[52] U.S. Cl. .............................. 423/247; 423/213.2
[51] Int. Cl.$^2$ .......................................... B01D 53/34
[58] Field of Search .......................... 423/213.2, 247

[56] References Cited
UNITED STATES PATENTS
3,168,368  2/1965  Mills ........................... 423/213.2 X

*Primary Examiner*—Earl C. Thomas
*Attorney, Agent, or Firm*—Dean E. Carlson; Arthur A. Churm; James W. Weinberger

[57] ABSTRACT

A process and catalyst are disclosed for purifying an atmosphere containing carbon monoxide by passing the atmosphere through a bed of a catalyst of $TbO_x$, where $x = 1.8$ to $1.5$, which oxidizes the carbon monoxide to carbon dioxide.

4 Claims, No Drawings

METHOD OF REMOVING CARBON MONOXIDE FROM GASES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to the purification of an atmosphere of pollutants. More specifically, the invention relates to the purification of an atmosphere containing carbon monoxide. Still more specifically, the invention relates to a method of purifying an atmosphere of carbon monoxide by catalytic oxidation of the carbon monoxide to carbon dioxide.

Carbon monoxide (CO) is the most widely distributed and the most commonly occurring air pollutant. Total emissions of CO to the atmosphere exceed those of all other pollutants combined. Most atmospheric CO is produced by the incomplete combustion of carbonaceous material used as fuels for vehicles, space heating, and industrial processing, or burned as refuse. Automobiles are especially notorious for producing this gas. It has been estimated that in Los Angeles County more than 3 million motor vehicles per day pollute the air with 8000 tons of carbon monoxide, for an average of more than 5 pounds per vehicle per day.

Carbon monoxide is an odorless and colorless gas which is a poisonous inhalant. No other toxic gaseous air pollutant is found at such relatively high concentrations in the urban atmosphere. Carbon monoxide is dangerous because the affinity of hemoglobin is about 200 times greater for carbon monoxide than it is for oxygen. Thus, the effect of carbon monoxide on the human body is to deprive the tissues of necessary oxygen. 100 parts per million is generally considered the upper limit of safety in industry for healthy persons within certain age ranges when exposure may continue for an 8-hour period. Many people experience dizziness, headaches, lassitude and other symptoms at approximately 100 ppm.

Present measurements do not show that this level is often exceeded in cities in the United States, although in commercial and industrial districts of certain cities the concentration of carbon monoxide has ranged from 0 to 55 ppm, with an average of 9.5 ppm. Concentrations higher than this occasionally occur in garages, tunnels, behind automobiles and in the open atmosphere.

Since carbon monoxide results from incomplete combustion of carbonaceous materials, the obvious control measure is more complete combustion. In many cases this will lead to increased fuel economy. Combustion of carbon monoxide yields nearly as much heat as the combustion of fuels to carbon monoxide. Today's automobile engines do not function well on fuel mixtures sufficiently lean to accomplish a major reduction of the carbon monoxide emitted. The present approach to automobile exhaust control is to use catalysts which will oxidize the poisonous carbon monoxide to carbon dioxide which is relatively harmless. A number of catalysts are known which produce this oxidation reaction, such as copper oxide-alumina catalyst, platinum-nickel, rhenium catalyst and copper-chromium catalyst. The catalyst which appears to show the best promise in the catalysis of this reaction is a ½% platinum on an inert substrate material catalyst. However, there are problems associated with the use of a platinum catalyst, principally in its cost, which at present is approximately $2000 per pound.

SUMMARY OF THE INVENTION

We have found a rare earth oxide which will catalyze the oxidation of carbon monoxide to carbon dioxide almost as efficiently as will the commercially available catalysts. It has been found that terbium oxide will catalyze the oxidation of carbon monoxide almost as effectively as the platinum catalysts and has the advantage of being substantially cheaper, since it is presently available at about one-tenth the cost. By the method of our invention for purifying an atmosphere containing oxygen of carbon monoxide which may be contained therein, the atmosphere is passed through a bed of a catalyst of terbium oxide, whereby the carbon monoxide in the atmosphere is oxidized to carbon dioxide, and recirculating the purified atmosphere. The invention also pertains to a catalyst for oxidizing carbon monoxide, comprising terbium oxide.

It is envisioned that the method and catalyst of this invention will find application in the purification of an atmosphere containing carbon monoxide such as is found in a vehicular tunnel or in a closed automobile parking garage, or any other relatively closed area where a high concentration of carbon monoxide may be found to exist. The invention may also find application in the oxidation of carbon monoxide as it is contained in a waste gas stream such as would be emitted by an operating internal combustion engine.

It is therefore one object of this invention to provide a method and catalyst for oxidizing carbon monoxide to carbon dioxide.

It is a further object of this invention to provide an improved method for purifying an atmosphere of carbon monoxide.

Finally, it is an object of this invention to provide an effective and relatively inexpensive method for purifying an atmosphere containing carbon monoxide by catalytically oxidizing the carbon monoxide to carbon dioxide.

DETAILED DESCRIPTION OF THE PREFERRED EMBODIMENT

These and other objects of the invention can be obtained by passing an atmosphere containing oxygen and carbon monoxide through a bed of a catalyst of $TbO_x$, where $x = 1.8$ to $1.5$, which has been heated to activation temperature of at least about 350°C., whereby the carbon monoxide in the atmosphere is oxidized to carbon dioxide, and the thus purified atmosphere is recirculated. The catalyst bed can comprise either pure powdered $TbO_x$ or it can comprise $TbO_x$ dispersed on a porous catalytically inert high-surface-area material such as activated alumina, silica, or silica-alumina. If an inert support is present, the terbium oxide should be present on the support in a concentration of at least about 0.5% by weight.

It was found necessary that the catalyst be heated to an activation temperature in order to initiate oxidation of carbon monoxide, although once oxidation of the carbon monoxide had commenced, the temperature of the catalyst may fall as low as about 90°C. and the catalyst would continue to remain reactive, although at a somewhat reduced efficiency. In general, the minimum activation temperature was found to be about 350°C. The maximum temperature at which catalysis will occur is not known, although the catalyst has proved effective at temperatures up to about 500°C.

It is necessary that the minimum mole ratio of carbon monoxide to oxygen in the atmosphere be less than or equal to 2 to 1 in order to ensure oxidation of the carbon monoxide.

The exact terbium oxide responsible for the catalysis is not completely known. There are five stable phases of $TbO_x$, where $x = 1.5$ to $2.0$. A brown terbium oxide was obtained by firing precipitated terbium oxalate at a temperature of 850°C. It is known that $TbO_{1.8}$ is dark brown in color. It was also found that, when the catalyst was subjected to a temperature above 500°C., a light cream color was obtained. It is known that $TbO_{1.5}$ is light cream in color, which makes it seem clear that more than one oxide species may be responsible for the conversion and that the system responsible for the conversion may not be at all simple.

EXAMPLE I

A standard flow reactor designed to insure thermal equilibrium at furnace temperatures before contact of the gases with the catalyst was utilized to test catalytic activity. A Varian A-90-P gas chromatograph with thermal conductivity detector was used for reactant and product identification. Tests for activity towards the reaction of CO with $O_2$ were made with the reactants at atmospheric pressure and with the partial pressures of CO to $O_2$ in the ratio of 2 to 1. Typical flow rates through the reactor were 10 cc per second for CO, and 5 cc per second for $O_2$. Five grams of terbium oxide were used for the determination of activity. It was determined that the surface area using the BET method for terbium oxide was found to be 3.4 meters$^2$/gram. It was determined that a reactor temperature of about 350°C. was necessary to initiate catalysis. After activation, the reactor temperature could be lowered to about 80°C., but the heat of reaction would maintain the catalyst at 180°C. under the conditions of measurement. The yield of $CO_2$ as a function of temperature is given in the table below.

| Catalyst Temperature | $CO_2$ yield |
| --- | --- |
| 182°C. | 71% |
| 248°C. | 80% |
| 370°C. | 94% |
| 554°C. | ~99% |
| 575°C. | ~100% |

EXAMPLE II

A further experiment was run to determine the effect of water vapor upon the catalytic oxidation of CO to $CO_2$. A standard flow reactor system as was used for Example I was set up. The CO and $O_2$ were flowed through the reactor as in the previous example, except that 17 Torr water vapor was present in addition to the initial reactants. To within the accuracy of the measurements, the yields were found to be unaffected by the presence of water vapor at this pressure over a period of 26 hours. The yield at 350°C. was found to be 92 percent. Sufficient quantities of CO and $O_2$ were run through the reactor to insure that the terbium oxide was, in fact, acting as a catalyst and not a reactant in the conversion.

EXAMPLE III

An additional experiment is run to determine the efficiency of the terbium oxide catalyst at low carbon monoxide concentrations. Using the flow reactor as described previously, an atmosphere containing oxygen and 400 ppm of carbon monoxide is passed at a flow rate of 5 liter/sec over a bed of 10 grams of terbium oxide heated to a temperature of 350°C. It is determined that the maximum concentration of carbon monoxide in the atmosphere after passing through the catalyst is 30 ppm. In an experiment similar to the above except that the bed temperature is 100°C., it is determined that the maximum concentration of carbon monoxide in the atmosphere after passing through the catalyst is 200 ppm.

It can be seen from the previous discussion and the above examples that the terbium oxide $TbO_x$, where $x = 1.8$ to $1.5$, is an effective catalyst in the conversion and the oxidation of CO to $CO_2$ and is effective in the reduction of CO levels in the atmosphere.

The embodiments of the invention in which an exclusive property or privilege is claimed are defined as follows:

1. A method of purifying an atmosphere, containing oxygen, of carbon monoxide which may be contained therein comprising: passing the atmosphere through a bed of a catalyst of terbium oxide heated to activation temperature, whereby the carbon monoxide is oxidized to carbon dioxide thereby purifying the atmosphere of carbon monoxide.

2. The process of claim 1 wherein the terbium oxide is on an inert substrate.

3. The process of claim 2 wherein the terbium oxide is $TbO_x$, where $x = 1.8$ to $1.5$.

4. The process of claim 3 wherein the activation temperature is 350°C.

* * * * *